United States Patent [19]
Sollars, Jr.

[11] Patent Number: 5,277,230
[45] Date of Patent: Jan. 11, 1994

[54] DOUBLE TWILLWOVEN AIR BAG FABRIC

[75] Inventor: John A. Sollars, Jr., LaGrange, Ga.

[73] Assignee: Milliken Research Corporation, Spartanburg, S.C.

[21] Appl. No.: 20,547

[22] Filed: Feb. 22, 1993

[51] Int. Cl.$^5$ .......................................... D03D 25/00
[52] U.S. Cl. .................................. 139/389; 139/416; 5/449; 206/6; 383/3; 383/117; 428/257; 280/743 A
[58] Field of Search ................ 280/743; 139/416, 389, 139/383; 5/449, 453; 206/6; 383/3, 117; 428/257

[56] References Cited
U.S. PATENT DOCUMENTS 928,642  7/1909  Elliott .
3,991,249  11/1976  Yamashita et al. ................ 139/389
4,840,397  6/1989  Katz et al. .
4,921,735  5/1990  Bloch .
5,011,183  4/1991  Thornton et al. .......... 280/743 R X
5,131,434  7/1992  Krummheuer et al. .... 280/743 R X

FOREIGN PATENT DOCUMENTS 018335  10/1980  European Pat. Off. .
767668  3/1953  Fed. Rep. of Germany .
962693  7/1964  United Kingdom .

Primary Examiner—Andrew M. Falik
Attorney, Agent, or Firm—Earle R. Marden; Terry T. Moyer

[57] ABSTRACT

An air bag employing a twill-like fabric having right hand and left hand diagonally extending twill lines which form a diamond shaped portion therebetween. The diamond portion can be of a plain weave or other type of weave depending on the desired fabric porosity.

10 Claims, 3 Drawing Sheets

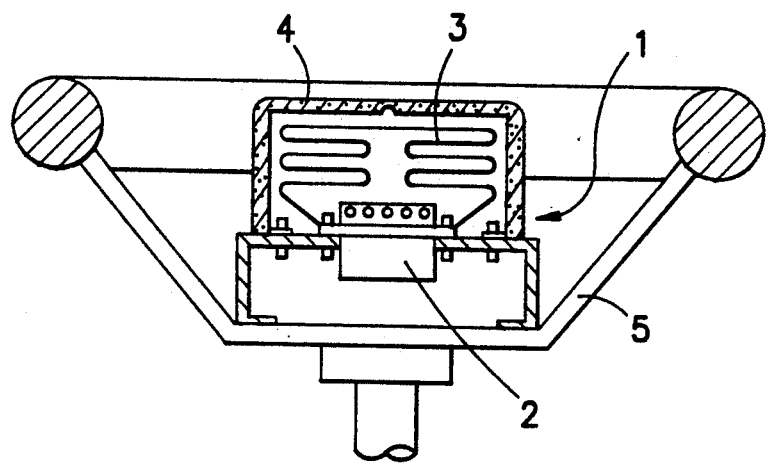
FIG. -1-
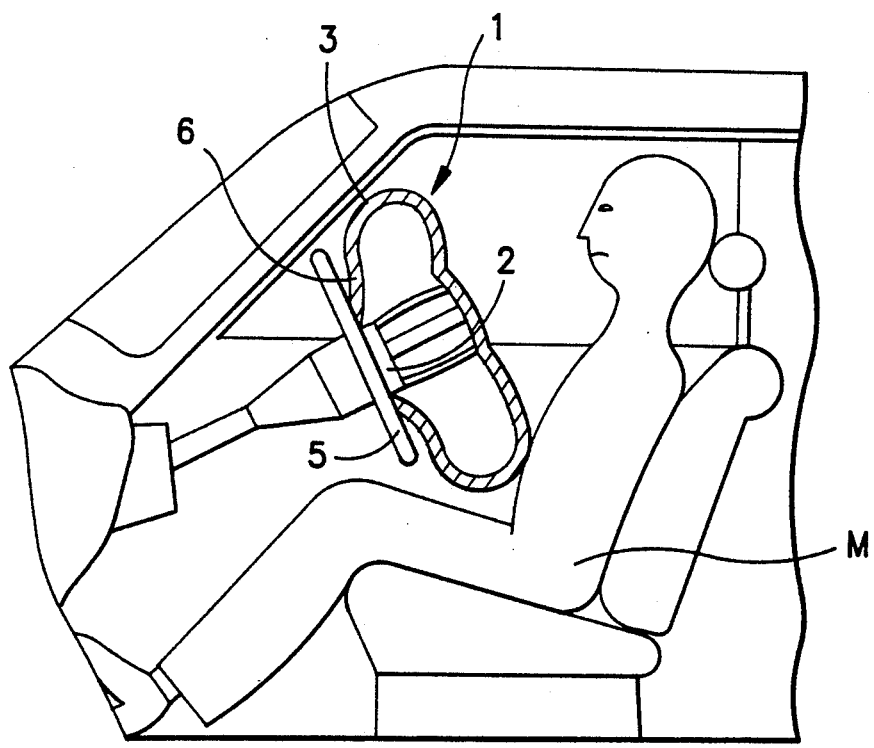
FIG. -2-

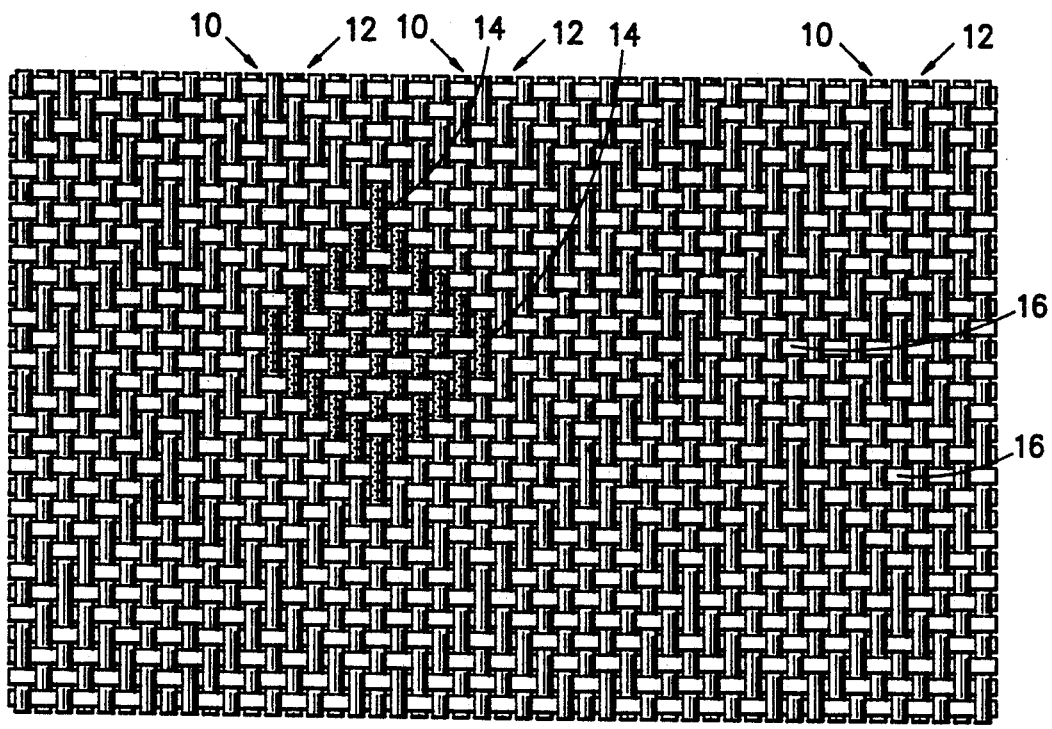
FIG. -3-
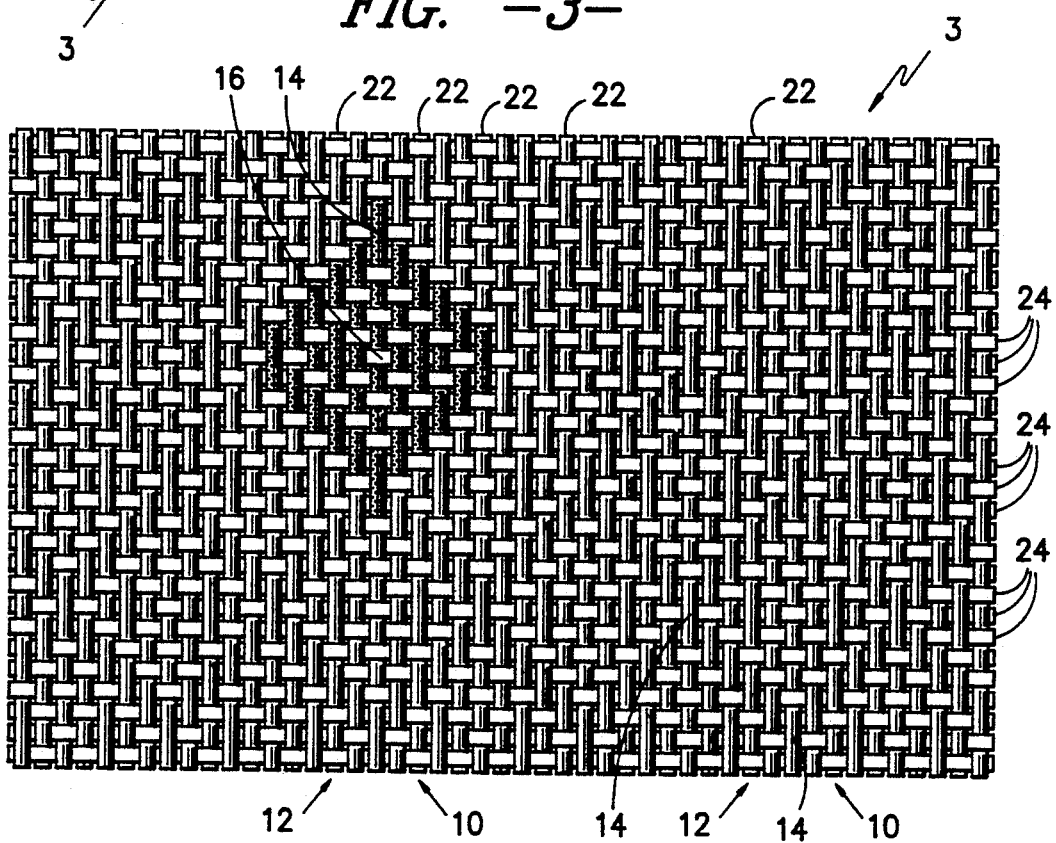
FIG. -4-

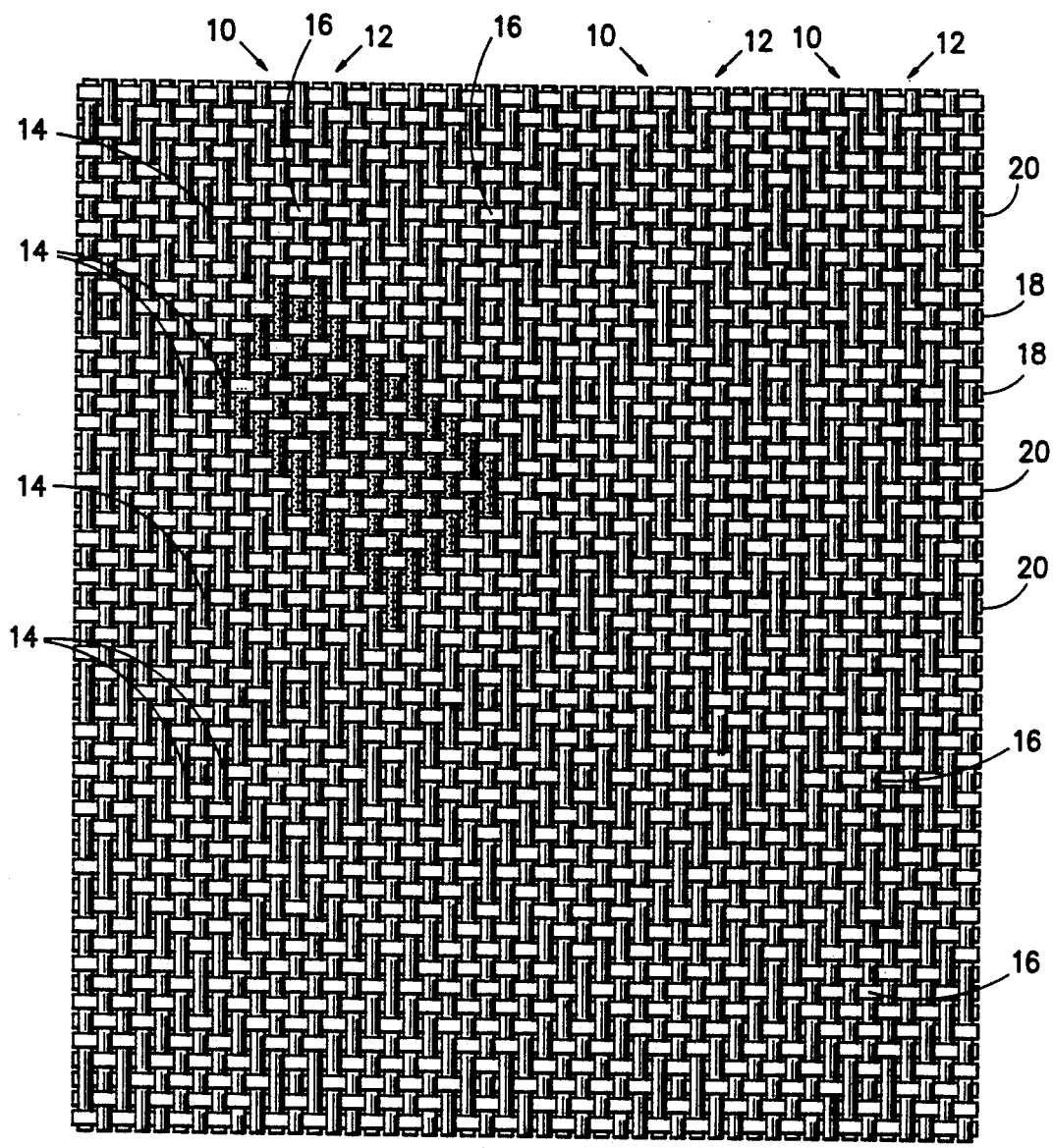
FIG. -5-

DOUBLE TWILLWOVEN AIR BAG FABRIC

This invention relates generally to a new and improved woven fabric and in particular to a woven fabric for use in air bags having intersecting diagonal twill lines.

Traditionally fabrics used for "air bag" usage have been of a plain weave, rip stop, or basket weave construction. At certain densities or yarn sizes these constructions can have other than desired properties of stiffness, tear strength, or gas permeability. Fabrics made from twill constructions are more flexible, tear resistant, and have higher gas permeability than a plain weave fabric for a given construction and weight. Fabric made from one of the many twill constructions in common use in the textile industry has the disadvantage of having more stretch when pulled on one diagonal direction than when pulled from the other. The permeability of twill fabric to gas may be too high for certain applications.

Therefore, it is an object of the invention to provide a woven fabric with intersecting diagonal twill lines which is particularly useful in the production of air bags for automotive use.

Other objects and advantages of the invention will become readily apparent as the specification proceeds to describe the invention with reference to the accompanying drawings, in which:

FIG. 1 is a schematic cross-section view of a typical air bag installation mounted in a steering wheel;

FIG. 2 is a schematic view showing the air bag of FIG. 1 in expanded condition; and FIGS. 3-5 are schematic representations of the weave design of the new and improved woven fabric which can be employed in the air bag of FIGS. 1 and 2 as well as other types of air bags.

The air bag equipment as installed on a fixed portion of a car body in front of a car seat plays an important role for the protection of a person in the car from injury due to the collision of the car body as the air bag is instantaneously inflated at the collision of the vehicle by the pressure of reaction gas released from an inflator, which is fixed on a steering wheel or dashboard.

In such air bag equipment 1, for example, chemical reaction of gas generating agent is induced by a collision signal from a collision detection sensor when the vehicle deceleration is higher than a predetermined level as shown in FIG. 1. It comprises an inflator 2 to inject the reaction gas, and an air bag 3, the base of which is fixed on the inflator 2 and which is inflated by the gas injected from the inflator 1. This air bag equipment is mounted on a fixed portion of a car body such as the central portion of the steering wheel 5 with the air bag folded up and accommodated in a pad 4.

As shown in FIG. 2 the gas generating agent in the inflator 2 starts the reaction when the vehicle is collided, and the air bag 3 is instantaneously expanded by the reaction gas thus generated. The air bag receives the person M, who is thrown forward by inertia, and protects him from the collision with the car body.

When the person M is collided with and received by the air bag 3 inflated at the collision of the car, the pressure in the air bag 3 is relatively high, and the impact caused by the collision is big. In order to alleviate such impact, an exhaust outlet is provided on the air bag 1. By gradually releasing high pressure gas of the air bag 3 from this exhaust outlet 6, the impact due to the collision of the person M with air bag 3 is absorbed.

FIGS. 1 and 2 are merely representative of one type of air bag usage and design and the woven fabric used in the air bag 3 can be of different constructions. The herein-disclosed woven fabric construction can be used in those areas of an air bag where it is desired to provide tear resistance and control the flow of gaseous substance through the air bag fabric. Variations of the herein-disclosed fabric can be used as either a face fabric where it is desired to have low permeability or, the back of the bag where it may be desired to have high permeability or at the sides of the bag (passenger bag) where a pre-selected amount of permeability is desired.

Basically the new and improved air bag fabric 3 is a woven fabric having diagonal right hand and left hand $2 \times 1$ twill lines 10 and 12 intersecting at 14 to provide diamond or square portions 16 therebetween, preferably of a plain weave. The preferred form of the air bag fabric 3 as shown in FIG. 3 is a 100% nylon fabric of 420 denier yarn having 49 ends and picks per inch and a finished weight of 5.6 oz/yd$^2$. It is understood that the construction can vary depending on the intended use so other yarns, such as polyester, can be used with the denier of same being in the range of 200-850 denier to produce fabrics with a finished count of 30-110 ends and/or picks per inch. The finished weight of the fabric can be between 5-8 oz/yd$^2$.

As previously, briefly discussed a twill fabric is more porous than a plain weave fabric. The herein-described woven fabric provides a means to vary the porosity of the fabric by changing the yarn, the spacing between twill lines 10 and 12 to vary the size of the diamond portion 16 and/or the weave construction in the diamond portion 16. Thus, if desired, the weave density or number of threads per inch along with the weight can be held constant while the weave pattern and scale can be varied to achieve the desired porosity or tear resistance.

One example of a variation of the basic fabric is shown in FIG. 5 where the spacing between twill lines 10 and 12 is varied to provide two rows of diamond portions 16 represented by centrally located weft yarns 18 which are smaller than the next two rows of diamond portions 16 represented by centrally located weft yarns 20. This arrangement provides a fabric that will be somewhat more porous than the fabric shown in FIG. 3.

Another modification that can be employed is that exemplified in FIG. 4 where certain warp yarns 22, as shown in the emphasized diamond portion 16, are floated over three weft yarns 21 to provide a more porous section or sections in each of the diamond portions 16 of the fabric 3.

It can be seen that a woven air bag fabric has been described that has excellent tear resistance and flexibility but provides the basis for varying the construction thereof to vary the porosity thereof depending on the desired use of the fabric in the air bag. Such versatility is very difficult to obtain in a plain weave, rip stop or basket weave fabric.

Other modifications can be made within the scope of the described invention and therefore it is desired that the invention be limited only by the scope of the claims.

I claim:

1. An air bag adapted to be used in conjunction with air bag equipment in a motor vehicle comprising: an inflatable fabric, said inflatable fabric having at least one portion thereof being a woven fabric, said woven fabric having a plurality of right and left interconnected twill lines forming a plurality of diamond shaped areas therebetween.

2. The air bag of claim 1 wherein said woven fabric is comprised of substantially 100% continuous filament synthetic yarn.

3. The air bag of claim 2 wherein said yarn is polyester.

4. The air bag of claim 2 wherein said yarn is nylon.

5. The air bag of claim 1 wherein the formed diamond areas in one portion of said fabric are smaller than the diamond shaped areas in other portions of said fabric.

6. The air bag of claim 1 wherein at least one of the warp yarns in each diamond area is floated over a plurality of fill yarns in the same diamond shaped area to change the porosity thereof.

7. The air bag of claim 6 wherein said woven fabric is comprised of substantially 100% continuous filament synthetic yarn.

8. The air bag of claim 7 wherein said yarn is polyester.

9. The air bag of claim 8 wherein said yarn is nylon.

10. The air bag of claim 5 wherein at least one of the warp yarns in each diamond shaped area is floated over a plurality of fill yarns in the same diamond shaped area to change the porosity thereof.

* * * * *